United States Patent
Takakusaki et al.

(10) Patent No.: US 6,217,817 B1
(45) Date of Patent: Apr. 17, 2001

(54) METHOD FOR BLOW-MOLDING TUBE CONTAINER

(75) Inventors: Nobuyuki Takakusaki, Yokohama; Yoshimi Terajima, Ebina; Isamu Takeda, Tokyo, all of (JP)

(73) Assignee: Toyo Seikan Kaisya, Ltd., Tokyo (JP)

( * ) Notice: Subject to any disclaimer, the term of this patent is extended or adjusted under 35 U.S.C. 154(b) by 0 days.

(21) Appl. No.: 08/584,655

(22) Filed: Jan. 11, 1996

Related U.S. Application Data

(63) Continuation-in-part of application No. 08/256,146, filed on Oct. 6, 1994, now abandoned.

(51) Int. Cl.⁷ ............................. B29C 49/00; B29C 49/62
(52) U.S. Cl. ..................... 264/504; 264/520; 264/526; 264/540
(58) Field of Search ............... 264/28, 520, 526, 264/540, 504, 536; 425/526, 532, 535, 536

(56) References Cited

U.S. PATENT DOCUMENTS

| | | | |
|---|---|---|---|
| 3,114,931 | 12/1963 | Pelikan | 264/526 |
| 3,197,532 | 7/1965 | Maass | 264/527 |
| 3,337,911 | * 8/1967 | Settembrini | 264/504 |
| 3,338,998 | 8/1967 | Di Settembrini | 264/526 |
| 3,450,805 | 6/1969 | Chesser | 264/526 |
| 3,492,106 | 1/1970 | Peters et al. | 264/529 |
| 3,505,442 | 4/1970 | Culpepper | 264/526 |
| 3,592,886 | 7/1971 | Havely | 264/526 |
| 3,661,483 | 5/1972 | Bose | 264/28 |
| 4,092,389 | * 5/1978 | Sakurai | 264/89 |

FOREIGN PATENT DOCUMENTS

| | | | |
|---|---|---|---|
| 1220563 | 3/1960 | (FR) | 264/527 |
| 74.14738 | 11/1974 | (FR) | 425/536 |
| 38-11831 | 7/1938 | (JP) | 264/527 |

* cited by examiner

Primary Examiner—Mathieu D. Vargot
Assistant Examiner—Suzanne E. McDowell
(74) Attorney, Agent, or Firm—Armstrong, Westerman, Hattori, McLeland & Naughton, LLP

(57) ABSTRACT

A blow molding method for molding tube containers by introducing blow air into a parison having been extruded by an extruder is disclosed, which comprises introducing blow air into the parison to shape a tube container and form a discharge outlet in part of the wall of an unnecessary portion of the tube container located lower than the cutting position of the tube container, and further continuing the introduction of blow air. The blow air may be introduced horizontally by piercing the wall of a parison having been extruded from an extruder with a nozzle for introducing blow air or vertically by introducing blow air in the axial direction of the parison. The discharge outlet is formed in part of the side wall or bottom wall of the container below a cutting position preferably as low as possible. The discharge outlet may be formed by pressing the wall of a softening-state tube container against an opening of a passageway formed in the mold and connecting to the cavity with the compressed blow air to break through the tube container at the corresponding portion or by piercing with a needle-like member from outside the mold. This method enables one to shorten the cooling time necessary for cooling the tube container after blow molding and produce moldings having good dimensional accuracy with high efficiency.

4 Claims, 5 Drawing Sheets

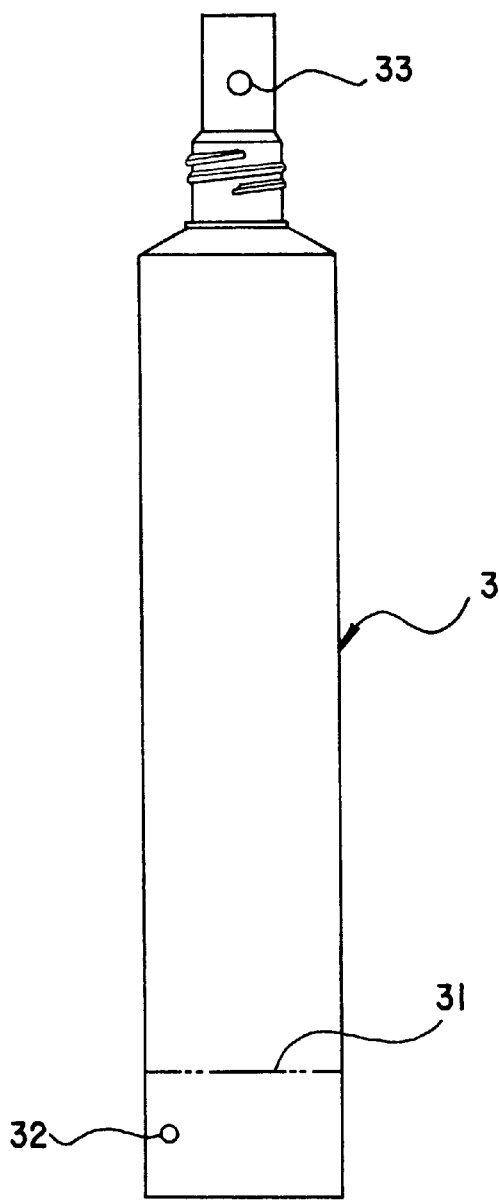
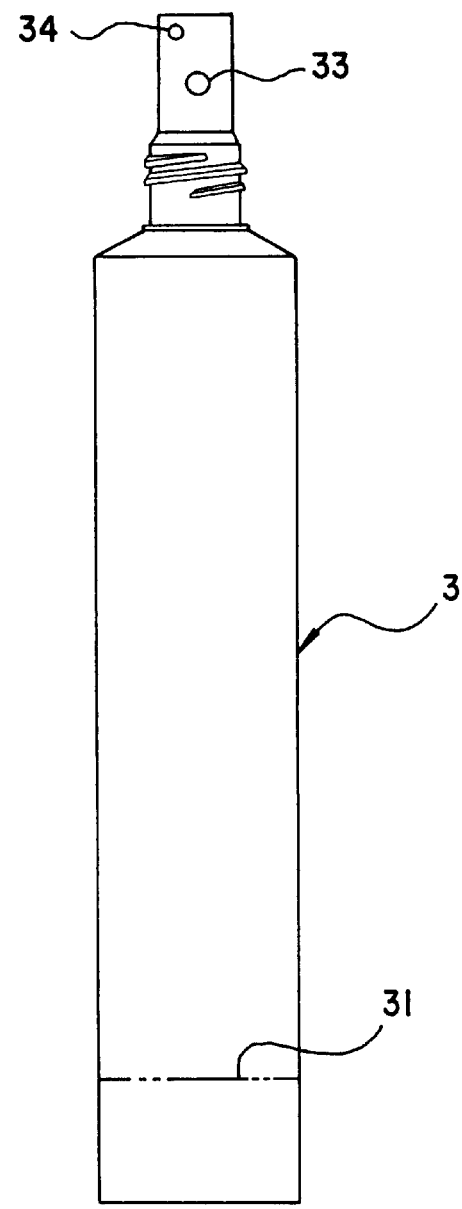

FIG.5
FIG.6
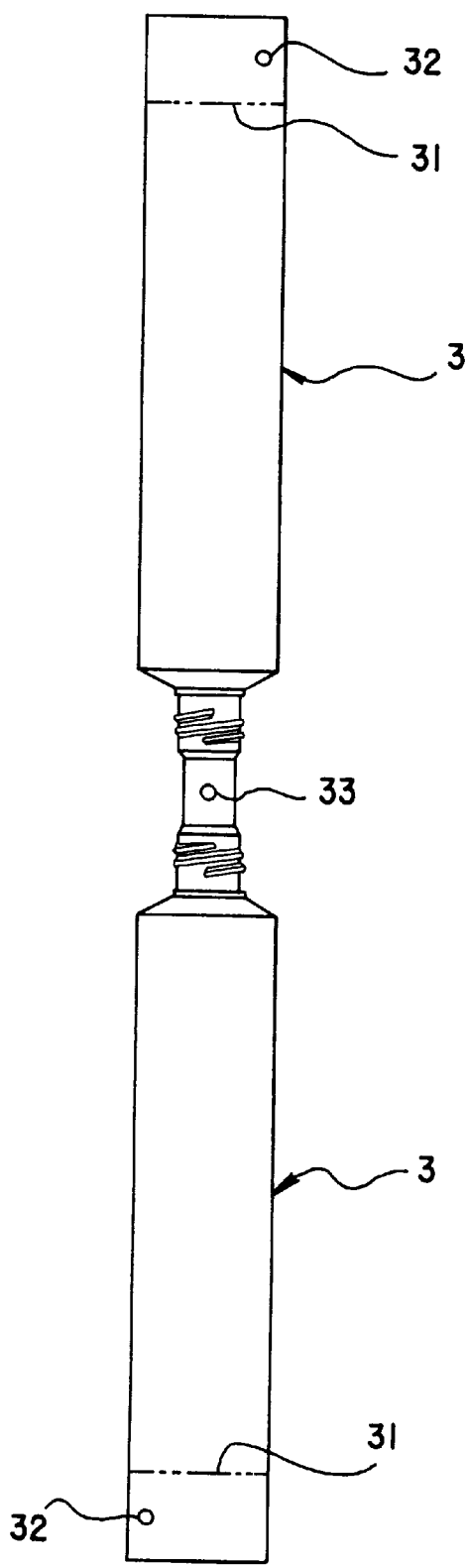
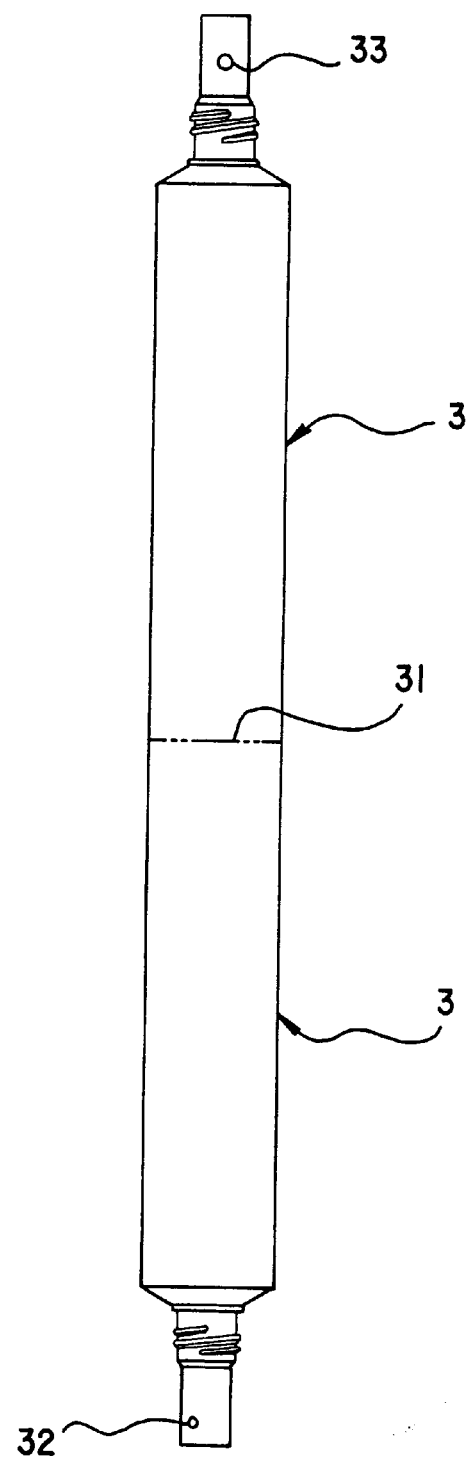

METHOD FOR BLOW-MOLDING TUBE CONTAINER

This is a continuation-in-part of application Serial No. 08/256,146, filed Oct. 6, 1994, abandoned.

TECHNICAL FIELD

This invention relates to a method for blow-molding a tube container and, more particularly, to a blow-molding method which enables one to shorten the time for cooling moldings immediately after being blow-molded and to effectively produce moldings having good dimensional accuracy.

PRIOR ART

In molding a tube container from a thermoplastic resin according to blow molding technique, it has been known to pierce the upper portion of a parison having been melt extruded from an extruder with a blow nozzle for introducing blow air, and blow compressed air into the parison through the nozzle, or to introduce compressed air into the parison from the upper portion or lower portion in the axial direction to thereby press the parison against the wall of a mold for shaping a closed-end cylindrical container, followed by cooling the container, taking it out of the mold, and cutting the lower portion thereof to produce a tube container.

The thus molded tube container is engaged with a cap, and the capped tube container is fed to a filling machine. Then, the tube container is filled with contents through the cut portion, and the cut end is sealed. The resulting tube containers are then brought to the market.

Japanese Examined Patent Publication No. S59-3260 discloses a blow molding method for producing hollow containers, in which nip-pressing plates located at the upper position of a split mold for holding a softened parison are not directly in contact with each other but are formed partly with a space therebetween, the nip-pressing plates co-work to nip the parison, the thus-sealed parison is pierced at its side wall with a blow nozzle, blow air is continuously fed through the blow nozzle to shape a hollow container, then the space portion of said nip-pressing plates are broken by the pressure of blow air to form a discharge outlet through which the pressing fluid filling the mold is discharged.

PROBLEMS THAT THE INVENTION IS TO SOLVE

As another conventional process for blow molding a hollow container such as a tube container, blow air introduced through a blowing inlet presses the softening-state parison against the wall of the mold to shape a tube container, then is discharged through a discharge outlet formed above the blow nozzle-pierced portion. However, since the molded tube container has a long and narrow form with a closed end, the blow air is discharged before sufficiently flowing within the tube container. Therefore, the blow air used for shaping the tube container does not flow but remains in the lower portion of the container. Thus, subsequent cooling of the wall of the tube container is mainly conducted by circulating cooling water in the mold in contact with the tube container.

However, this method requires a considerably long time for cooling the shaped tube container still kept at an elevated temperature to such a degree that the mold can be opened. Thus, there arises a problem in view of molding efficiency.

That is, in the conventional blow molding method for producing a tube container, cooling of the shaped moldings have been conducted only by cooling the mold, and nothing has been taken into consideration for enhancing cooling efficiency. In addition, although the manner of piercing the wall of a parison with a blow nozzle and shape of an air-introducing inlet have been studied, no attention has been paid to how the blow air introduced through the nozzle can most effectively shape and cool the molding (tube container).

OBJECTS OF THE INVENTION

An object of the present invention is to provide a method for blow molding a tube container, in which blow air introduced into the tube container will circulate therein even after shaping of the tube container to rapidly cool the tube container.

SUMMARY OF THE INVENTION

The present invention is proposed for attaining the above-described objects and relates to a method for blow molding a tube container, which comprises forming a discharge outlet for discharging blow air simultaneously with, or immediately after, shaping of the tube container in an unnecessary lower portion of the tube container to be cut off after molding, to thereby discharge successively introduced blow air.

That is, according to one aspect of the present invention, there is provided a method for blow molding a tube container using a parison having been extruded from an extruder, which comprises introducing blow air into the parison to shape a tube container, forming an outlet in the wall of an unnecessary portion of the tube container located on the opposite side where a blow air-introducing inlet is provided, and continuing feeding of the blow air.

According to another aspect of the present invention, there is provided a blow molding method for blow molding a tube container using a parison having been extruded from an extruder, which comprises introducing blow air into the parison to shape a tube container, forming an outlet in the outer wall of a portion of the tube container to be cut off, and continuing feeding of the blow air.

As to the manner of introducing blow air, either horizontally blowing type in which the wall of a parison having been extruded from an extruder is pierced with a blow nozzle for introducing blow air or vertically blowing type in which blow air is introduced in the axial direction of the parison, i.e., in the downward or upward direction, can be used.

The discharge outlet is preferably formed in the tube container simultaneously with or after shaping of the tube container. However, it may be formed during shaping or, for the reason of mechanical timing, some time after shaping.

Alternatively, the discharge outlet may be formed by pressing the wall of a softened tube container against an opening of the passageway formed in the wall of the mold and connecting to the cavity using the blow air, or by piercing the container with a needle-like member from outside the mold.

In the case of conducting the blow molding of the present invention in a horizontally blowing manner, another similar discharge outlet may be formed in the vicinity of or above the blow nozzle-pierced portion after forming a discharge outlet in part of the lower wall of the portion of tube container to be cut off.

The thus formed discharge outlet serves to effectively cool the portion in the vicinity of the blow nozzle-pierced portion.

BRIEF DESCRIPTION OF THE DRAWINGS

FIG. 3 is a schematic view illustrating a tube container in a state of being shaped by the blow molding method of the present invention and having a discharge outlet for blow air.

FIG. 4 is a schematic view illustrating a tube container formed by a conventional blow molding method.

FIGS. 5 and 6 are schematic views illustrating a blow molding method of the present invention for forming two tube containers using a two-cavity mold.

BEST MODE FOR PRACTICING THE INVENTION

A first technical feature of the present invention is to form a discharge outlet for blow air in the lower part of the portion to be cut off after shaping of a tube container, simultaneously with or immediately after the blow air filling the mold to shape the tube container.

Since the discharge outlet controls discharge of the blow air filling the tube container, the blow air does not stay inside the mold after formation of the tube container but circulates inside the tube container to rapidly cool the hot tube container.

Another technical feature of the present invention is that, after formation of the discharge outlet, introduction of the blow air is continued.

Continuous introduction of the blow air enables the blow air to effectively move within the tube container before being discharged, which serves to rapidly cool the tube container still in a hot state.

Therefore, combination of the above-described two technical features serves to more effectively conduct rapid cooling of the tube container.

This point is described in more detail below. The introduced blow air instantly descends toward the bottom of the tube container to reach the bottom. When the blow air reaches the bottom, the softening-state material is shaped in conformity with the shape of the mold and, at the same time or slightly later than that, a discharge outlet is formed in part of the wall of the lower portion to be cut off after molding, through which the blow air filling the mold is discharged. The discharge of the blow air permits smooth movement of continuously introduced blow air to thereby rapidly cool the tube container.

In blow molding of the tube container, a closed-end, tube-like container is first formed and, after taking the molding out of a mold, the lower part of the container is cut off to form an opening through which its contents are loaded. Upon shaping of the tube container, however, the introduced blow air is discharged out through the discharge outlet formed in the vicinity of or above the blow nozzle-pierced portion almost without circulation inside the container, particularly toward the bottom. Thus, cooling of the container, particularly cooling of the lower part thereof, by the blow air is not conducted, and the cooling is conducted only by the cooled mold in contact therewith.

Therefore, it takes a long period of time for the molded container to be cooled, leading to deteriorated molding efficiency.

According to the method of the present invention, a large amount of the blow air introduced through a blow nozzle moves toward the bottom, a discharge outlet is formed in part of the lower wall of the container to be cut off, and this discharge outlet accelerates circulation of the blow air inside the tube container and permits uniform and rapid cooling of the whole tube container. Thus, tube containers can be blow molded with high molding efficiency.

Figure 1:
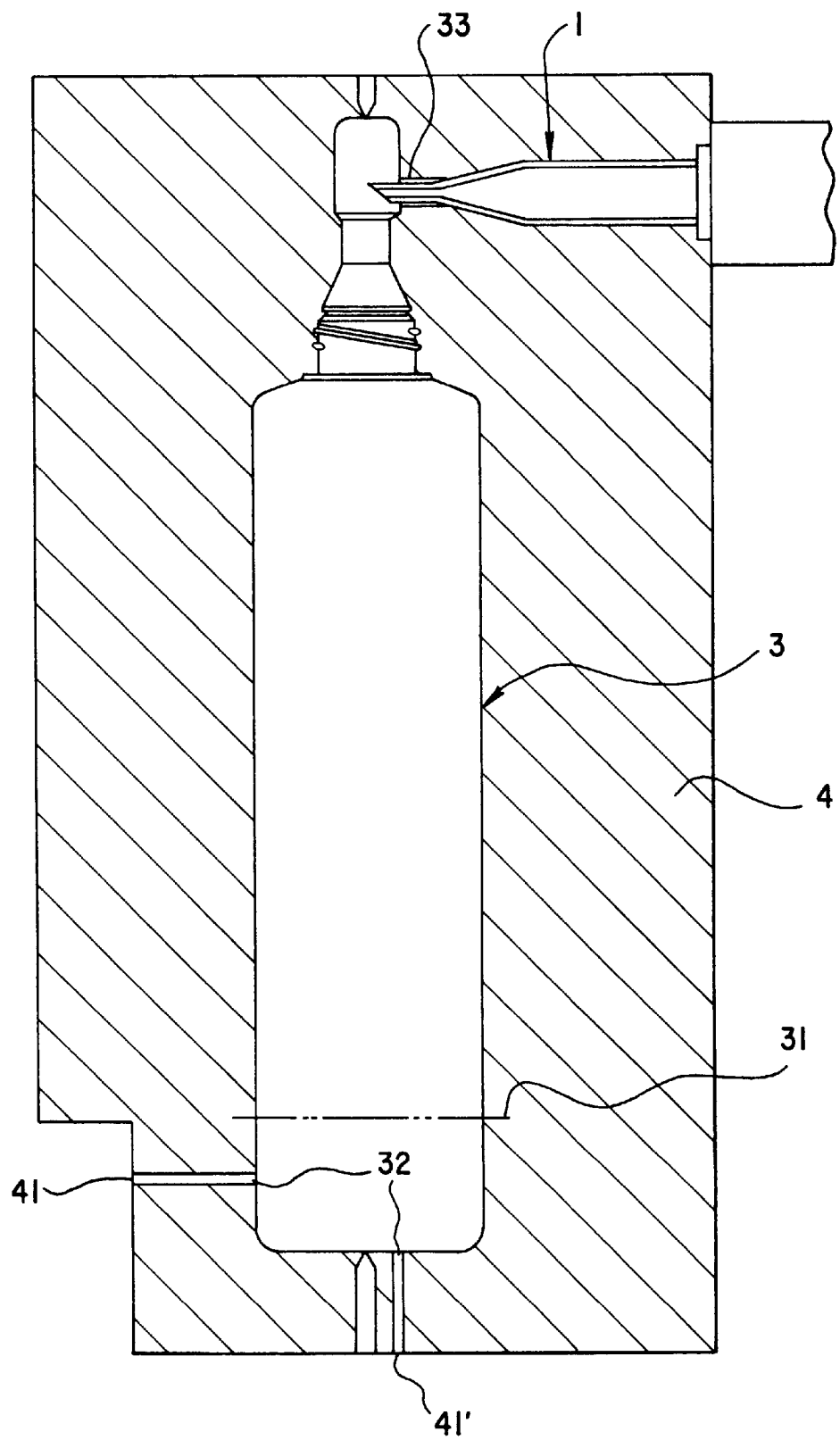
FIG. 1 is a schematic view illustrating one embodiment of the blow molding method of the present invention in which a tube container is blow molded in a horizontally blowing manner.

In FIG. 1, a blow air introduced through a blow air inlet 33 formed by piercing the upper portion of a parison with a blow nozzle 1 presses the softening-state parison against the surface of a mold to shape a tube container 3. In the present invention, a discharge outlet 32 is formed in part of the wall located lower than the position 31 along which the container will be cut after completion of the molding. As has been described hereinbefore, this discharge outlet 32 is preferably formed by breaking through the tube container at the particular portion of the wall below the cutting line 31 utilizing the pressure of blow air. However, it may be formed by piercing the wall with a needle-like member from outside the mold.

Since this discharge outlet controls discharge of the blow air inside the container, the blow air does not stay inside the container but smoothly circulates to rapidly cool the tube container. Said discharge outlet 32 may be formed either in the side wall or the bottom of the tube container, with the lower wall being preferred.

Additionally, in FIG. 1, description of tube container is made by reference to a one-cavity mold but, as is shown in FIGS. 5 and 6, the method of the present invention can similarly be applied to a two-cavity mold wherein two tube containers shown in FIG. 1 are to be molded in a vertical and symmetrical state with the bottom connecting to each other or with the unnecessary portions in the neck direction connecting to each other.

That is, in the case shown by FIG. 5, an intermediate unnecessary portion between two tube containers connecting to each other in a top-to-top manner is pierced with a blow nozzle to form a blowing inlet 33, whereas discharge outlets 32 may be formed outside the portions in the bottom direction located upward and downward to be cut off. In the case shown by FIG. 5, the discharge outlets may be formed in the vicinity of the top of each tube container, i.e., in the upper or lower portion to be cut off after shaping of the tube container.

In conventional blow molding methods, most of the blow air introduced through the upper portion of a parison once comes into contact with the wall opposite to the blowing inlet, then moves downward and upward but, upon shaping of a tube container, migration of blow air in the downward direction stops and breaks a thin portion located in the vicinity of or above the blow nozzle-pierced portion to form a discharge outlet 34, through which blow air is discharged. That is, blow air is discharged at this time, and hence circulation of blow air in the downward direction scarcely takes place. Thus, cooling of the molded tube container is conducted only by the mold in contact with the body of the container, resulting in seriously decreased cooling efficiency.

On the other hand, in the method of the present invention, blow air is discharged through a discharge outlet 32 formed in part of the wall below the cutting position 31 in the course of or after shaping of the tube container. Therefore, blow air introduced from above does not stay but effectively circulates before being discharged, thus tube container 3 being rapidly cooled.

The discharge outlet to be formed in part of the lower wall below the cutting line will be described in detail below.

One or more passageways (41 and 41') connecting to the 97 cavity are formed in one or more positions of the mold 4 for molding a tube container located below the cutting line, and a wall portion of shaped tube container corresponding to the opening or openings is broken through by the pressure of continuously fed blow air, and the broken portion forms a discharge outlet 32 functioning to control discharge of blow air.

As has been described hereinbefore, the discharge outlet 32 may be forcibly formed by piercing from outside of the passageways 41 and 41' with a needle member (not shown) instead of breakage from inside by the pressure of blow air. The needle member may be of an injection needle shape with a hollow core connecting to the outside of the mold or may be of a solid needle. In the case of using an injection needle-type member, the blow air is discharged out of the mold through its hollow portion. In the case of using a solid needle member, the blow air is discharged through a hole formed by drawing out the needle member after piercing the wall of the container with it.

Figure 7:
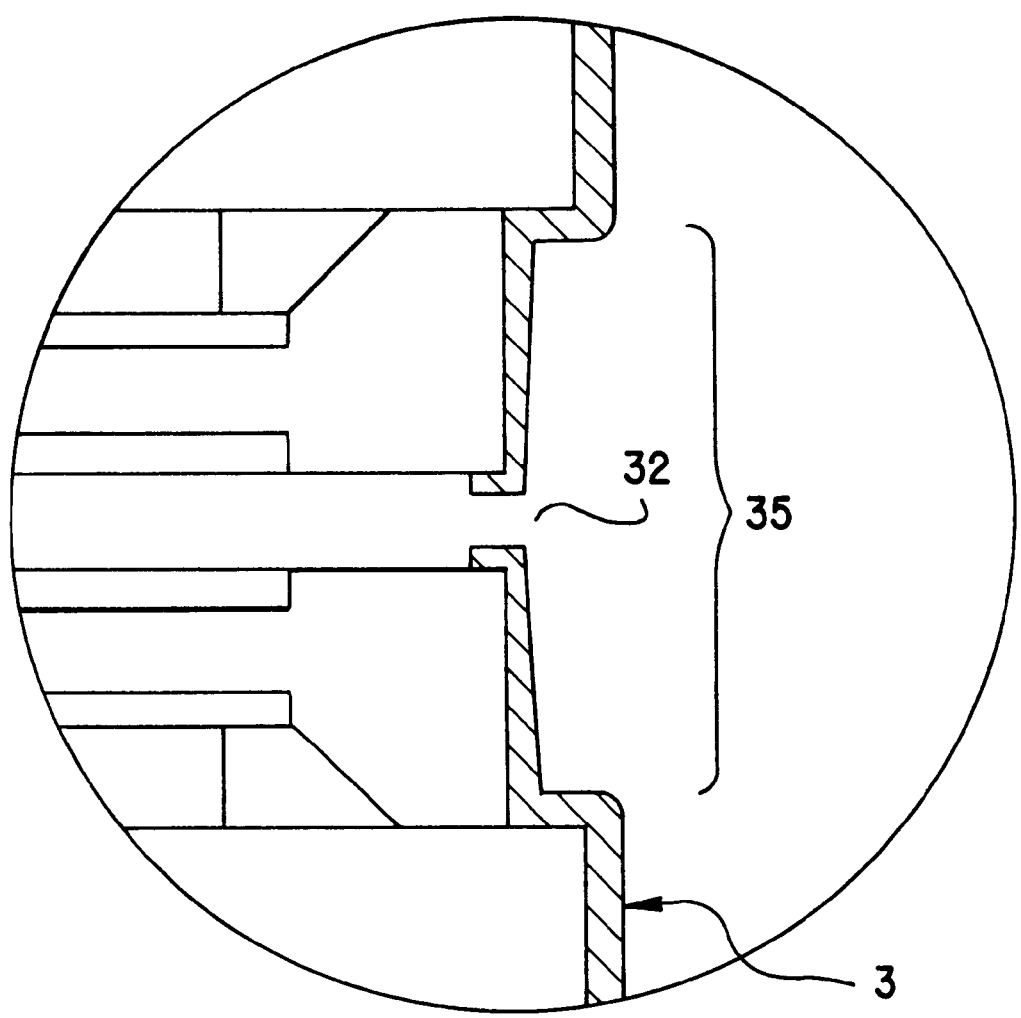
FIG. 7 is an enlarged schematic view illustrating the formation of the discharge outlet.

In a preferred embodiment shown in FIG. 7, a concave section 35 is formed in the mold, whereby the discharge port is communicated through the concave section to the outside of the mold. A diameter of an opening of the concave section is preferably 8 to 10 times larger than that of a diameter of the opening of the blow-air inlet port. Furthermore, a depth of the concave section is preferably in the range from 0.5 to 2.0 mm.

As for a relation between a diameter of an inlet port for introducing blow air and a diameter of a discharge port, a ratio of a diameter of a discharge port against a diameter of an inlet port is preferably in a range from 0.7 to 0.8 assuming that the latter is 1.

When converted to a cross-sectional area, a cross-sectional area of the discharge port is around 50 to 65% of that of the inlet port.

To insure that the ratio of a diameter of a discharge port against that of an inlet port is in a range from 0.7 to 0.8 , an outer diameter of a concave section of a die is set to around ∅ 9 with a diameter of the discharge port to ∅ 1.4, and also a depth of the concave section is set to a range from 0.5 to 2.0 mm, more preferably to around 1 mm.

With a configuration of the discharge pin described above, a wall thickness of a tube product, which is otherwise in a range from 0.4 to 0.5 mm, is reduced to around a half thereof, namely to a range from 0.2 to 0.25 mm, so that bursting can easily be executed with a hole diameter insured.

When the above relations are satisfied, the moldability of products can be maintained without extremely lowering the internal pressure, and the cooling efficiency can be improved by the flow of blow air.

The horizontally blowing type blow nozzle 1 to be used in the present invention is not limited to that shown by FIG. 1 as to the structure, but blow nozzles having a blow air-introducing inlet located at the central portion of the nozzle or nozzles having blow air-introducing inlets in vertical two directions or in 4 directions (vertical and horizontal) may properly be used.

Figure 2:
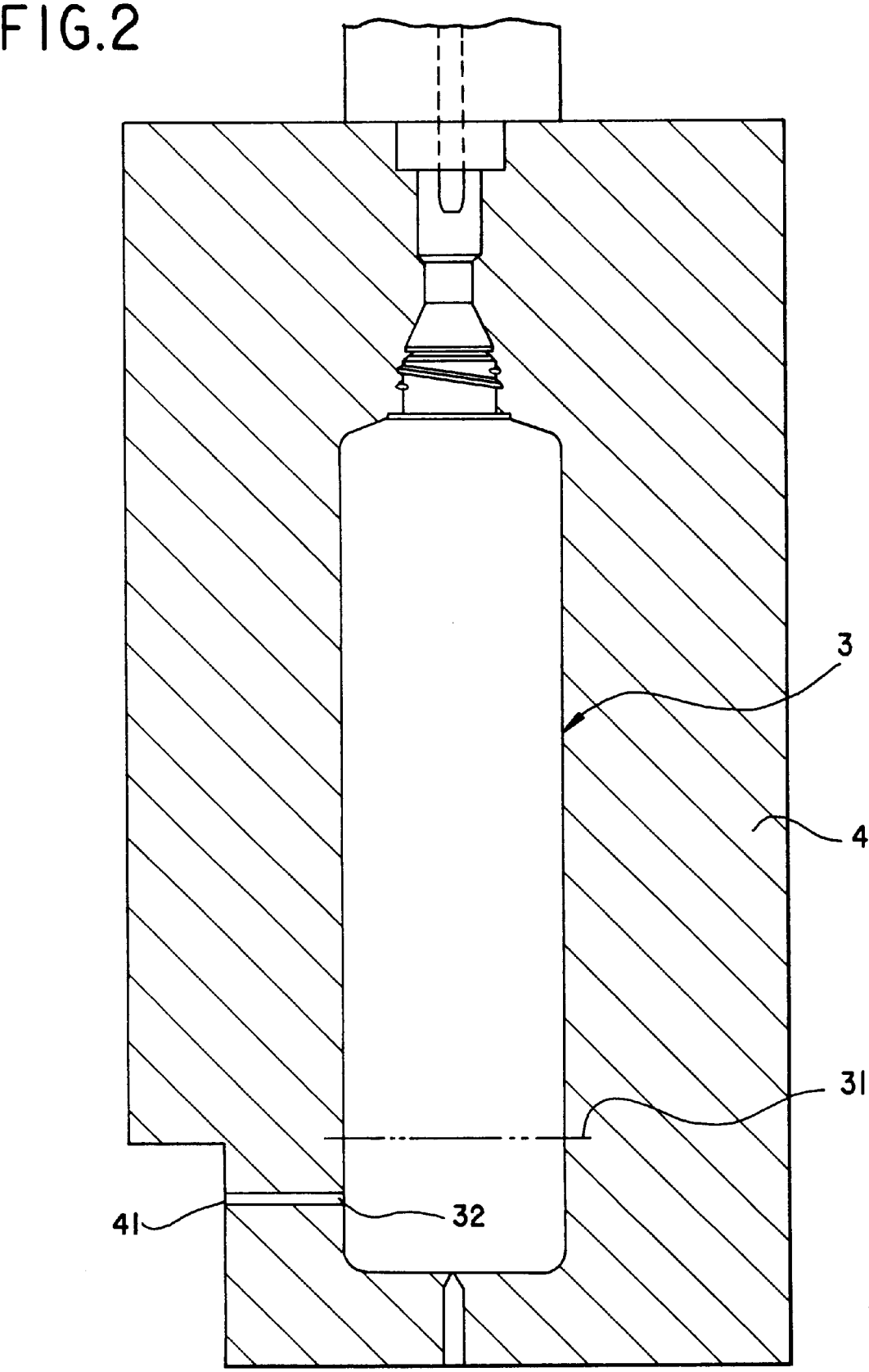
FIG. 2 is a schematic view illustrating another embodiment of the blow molding method of the present invention in which a tube container is blow molded in a vertically blowing manner.

For instance, as is shown in FIG. 2, a vertical blowing type blow nozzle which introduces blow air from above in the axial direction of a parison may also be used.

In the horizontally blowing type blow molding method shown in FIG. 1, an upper wall portion of a parison is pierced with blow nozzle 1, and the blow air-introducing inlet is located at about the center inside the parison, thus blow air being introduced in a horizontal direction into the parison. In the vertically blowing type blow molding method shown in FIG. 2, blow air is introduced in the axial direction of the parison, i.e., upward or downward.

In both blow molding methods, the parison is shaped into a tube container in conformity with the shape of the mold when blow air is introduced into the softening-state parison and, at this point, a discharge outlet 32 is formed in the wall in contact with a passageway 41 formed in the mold and located below the cutting line. Upon formation of the discharge outlet 32, the blow air filling the container is discharged, and hence the blow air effectively circulates within the container even after shaping of the container to contribute to rapid and uniform cooling of the shaped container.

However, the discharge outlet 32 is intended to cause air flow for moving the blow air within the tube container and not intended to discharge the whole blow air inside the tube container. Most of the blow air inside the tube container is discharged through the blowing inlet 33 formed upon piercing with the blow nozzle 1, simultaneously with rapid backward movement of the blow nozzle 1 at the completion of the introduction of blow air. Only at this point, the pressure within the tube container is restored to the atmospheric pressure. Additionally, discharge of blow air is also conducted through an opening (not shown) connecting to the blow nozzle.

As has been described in detail, the present invention permits blow air to effectively circulate within the tube container, and a blow molding cycle can be markedly shortened by using the opening left after backward movement of the blow nozzle as a main discharge outlet. Such advantage can be obtained only by forming the aforesaid discharge outlet 32 below the cutting line 31 located at the lower portion of the tube container.

EXAMPLE

Advantages of the present invention of blow molding a tube container are now described in more detail by reference to the following example.

Additionally, conditions under which the average temperature in thickness wise direction becomes 39.1° C. when blow molding conditions of 23° C. in blow air temperature, 14° C. in the surface temperature of the mold, and 9.5. seconds in cooling time are employed as in the conventional blow molding are taken as standard conditions.

Experiments of molding the same shaped moldings were conducted using the same materials and changing part of the blowing conditions to determine conditions for cooling the moldings to the average temperature of 39.1° C. in the thickness wise direction.

The blow nozzle used in the experiments had a blow ari-introducing inlet of 1.0 ∅, and 3) and the diameter of the discharge outlet formed below the cutting line was 0.7 ∅. A discharge outlet formed by the backward movement of the blow nozzle after completion of blowing was 2.0 ∅. Thus, discharge outlets of 0.7 ∅ and 2.0 ∅ functioned after completion of the blowing.

According to this experiment, when blow molding was conducted under the same conventional conditions, the average temperature in the thickness wise direction became 39.1 in 6.5 seconds.

That is, the blow molding method of the present invention shortens the molding cycle by 32% (100−6.5/9.5×100) in comparison with the conventional blow molding method.

As is clear from the above results of the experiments according to the present invention, blow air is instantly introduced and is allowed to rapidly circulate throughout the molding, and the blow air introduced with pressure is rapidly discharged, thereby blow molding cycle being markedly shortened.

Therefore, the constitution of the present invention that a large amount of blow air is fed and, after shaping, a discharge outlet is formed in an unnecessary portion of the wall of shaped container to thereby allow blow air to effectively circulate inside the molding has a remarkable technical significance.

Advantages of the Invention

As has been described in detail, according to the present invention, a discharge outlet is formed in part of the wall of a tube container below a cutting position, said tube container being shaped by introducing blow air, the blow air is then discharged through the discharge outlet to thereby allow the blow air to effectively circulate along the inside surface of the molding, and an opening left after backward movement of the blow nozzle functions as a main discharge outlet to instantly discharge the compressed air inside the molding. As a result, the molding can be cooled uniformly and rapidly.

What is claimed is:

1. A method of blow-molding tube containers, which comprises introducing blow air from an inlet port thereof into a parison having been extruded by an extruder thereby shaping a tube container and forming a discharge port in a portion of a wall of an unnecessary portion of the tube container located at an opposite side to the inlet port and successively applying blow air into the tube container, wherein the discharge port is formed in a concave section formed on an inner wall of a metal mold having a discharge port communicating to the outside of the metal mold by bursting the wall of the tube container in softened state by inner pressure of the blow air and wherein a cross-sectional area of an opening of the discharge port is 50% to 65% of a cross-sectional area of an opening of a blow air sucking section.

2. A method of blow-molding tube containers according to claim 1, wherein a diameter of the discharge port in the concave section is 8–10 times as much as a diameter of the opening of the inlet port in the blow air sucking section.

3. A method of blow-molding tube containers according to claim 2, wherein a depth of the concave section is 0.5–2.0 mm.

4. A method of blow-molding tube containers according to claim 1, wherein a depth of the concave section is 0.5–2.0 mm.

* * * * *